Patented Jan. 5, 1954

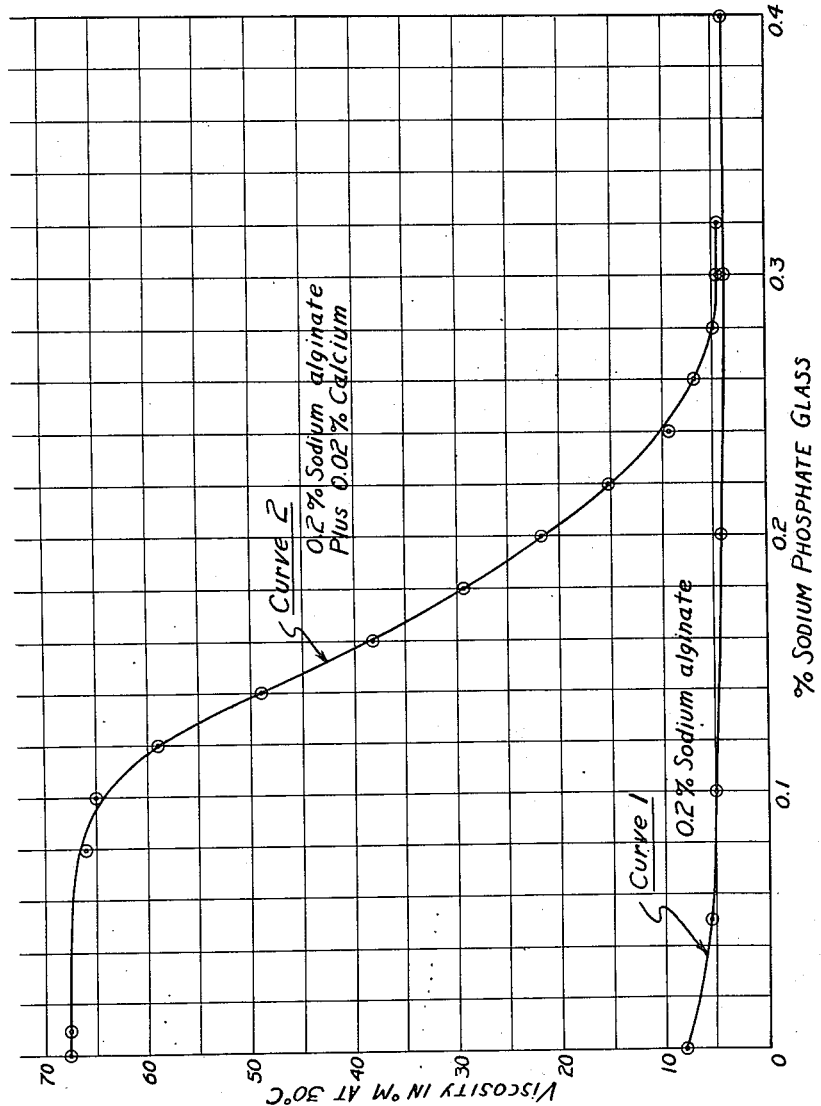

2,665,211

UNITED STATES PATENT OFFICE 2,665,211

TREATMENT OF AQUEOUS DISPERSIONS

Charles T. Roland, Bethel, Pa., assignor to Hall Laboratories, Inc., Pittsburgh, Pa., a corporation of Pennsylvania Application April 26, 1950, Serial No. 158,220

30 Claims. (Cl. 99—25)

This invention relates generally to the treatment of aqueous dispersions to control their viscosity and stability and more particularly to the treatment of aqueous dispersions with alginate materials to control the viscosity and stability of the dispersion. Hereafter when I speak of alginate materials and alginates without qualification I mean the water-dispersible or so-called "water-soluble" alginates. It is well known that sodium alginate and other "water-soluble" alginates are not truly water-soluble as the term might imply but are water dispersible to form colloidal dispersions, the viscosity of which increase markedly with the concentration of alginate.

This application is a continuation-in-part of my copending application Serial No. 513,450, filed December 8, 1943.

The commercial desirability and usefulness of many aqueous dispersions is much enhanced by controlling their viscosity and effectively stabilizing the dispersion. This is true of both edible and inedible dispersions. For example, chocolate milk drinks are much more attractive commercially if the cocoa particles from which they are made are maintained in suspension and prevented from settling out of the body of the fluid milk. Also, abrasive polishing compositions such as polishing creams are more satisfactory if the abrasive powder from which they obtain their effectiveness is held in suspension.

It has been proposed to use alginates, pectins and gelatin to stabilize such aqueous dispersions; however, it has heretofore been impossible to properly control the viscosity and at the same time the stabilizing effect to produce an entirely satisfactory product. Chocolate milk drinks to which a sufficient amount of any of these materials has been added to satisfactorily stabilize the dispersion is either jellied, or "slimy" or otherwise so modified as to be commercially undesirable.

I have found a process for treating such aqueous dispersions as are described above by which I can satisfactorily control the viscosity while at the same time effecting the desired stabilizing effect on the dispersion.

I have discovered a process of treating aqueous dispersions having as one constituent a water-soluble metal compound having the property of modifying the viscosity of an alginate dispersion or to which such a water-soluble metal compound has been added which process comprises generally the steps of adding to the dispersion a molecularly dehydrated phosphate in an amount so related to the total metal in solution that some but not all of the metal will be sequestered leaving some available metal ions in solution and then adding a water-soluble alginate to the dispersion whereby the free metal ions react with the alginate, the amount of free metal ions being so regulated that a portion only of the alginate will be reacted. The water-soluble alginate modifying metal ions may be either naturally occurring in the dispersion (as in the case of milk) or may be added for the purposes of my process.

I have found that the viscosity of alginate dispersions containing such metal compounds may be controlled by adding thereto or to the commercial powder from which the dispersion is to be made a molecularly dehydrated phosphate such, for example, as the sodium phosphate glass, commonly known as Graham's salt, or a commercial form of Graham's salt such as "Calgon," a form having a $Na_2O$ to $P_2O_5$ ratio of approximately 1.1:1.

More specifically, my process consists in adding to a given aqueous dispersion, a water-soluble metal compound, a water-soluble moleculary dehydrated phosphate and then adding the alginate material. The concentration of the phosphate compound in relation to the concentration of the metal compound is adjusted so that apparently some but not all of the metal ions in solution will be sequestered or tied up in a water-soluble, complex negative ion by the phosphate compound, thus leaving at all times some available metal ions in the solution. Upon the subsequent addition of the alginate material, these available or free metal ions can react with the alginate material but the concentration of the available or free metal ions in relation to the concentration of the alginate material is so controlled that a portion only of the alginate material will be reacted with these metal ions; thus there will always be present some alginate material reacted with metal ions, some alginate material in its unreacted form and some metal ions sequestered as complex negative ions.

I have found that the viscosities of such alginate dispersions can be effectively controlled within narrow limits of the desired viscosities by the addition of such metal compounds and such phosphate compounds in the manner just described or by the addition of the metal compounds and the phosphate compounds to the commercial powder from which the dispersion is to be made by the subsequent addition of water.

I have referred to sodium alginate as one of the water-soluble alginates. I may use this particular alginate or any one or more of the other "water-soluble" alginates whose viscosity in aqueous solution is influenced by the presence of metal ions such as, for example, potassium alginate, lithium alginate, ammonium alginate or magnesium alginate, or a mixture of alginates of the group of metals comprising the alkali metals, ammonium and magnesium.

I have found that the principal water-soluble metal compounds having the property of modifying the viscosity of alginate dispersions are the compounds of the bi- and tri-valent metals calcium, barium, strontium, silver, copper, zinc, aluminum, antimony, chromium, manganese, iron, cobalt, nickel, and lanthanum. It is to be borne in mind when choosing one of these metals for the purposes of my invention that only those which are known to be non-toxic should be used with products designed for food.

While I have specified that metal compounds be added to the aqueous dispersion or to the commercial powder, I have found that when the appropriate metal ions are naturally present in the aqueous alginate dispersion from the components, as in the case of calcium ions naturally occurring in milk, these metal ions will serve in my process without the addition of a metal compound when the proper amount of the phosphate compound is added, except when the naturally occurring metal ion concentration is too low, in which case a lesser amount of metal compound must be added to supply the deficiency.

I have stated that the phosphate compound for my process is a water-soluble molecularly dehydrated phosphate, and have specified that it must sequester bivalent or trivalent metal ions, which ever is employed, from the metal compound additive. The sodium phosphate compounds which I have found to serve in my process are the water-soluble molecularly dehydrated phosphates in the range from $1Na_2O:1P_2O_5$ (which is known as Graham's salt or sodium metaphosphate glass) to $2Na_2O:1P_2O_5$ (which is known as tetrasodium pyrophosphate). Most of these compounds are characteristically glassy or amorphous in physical structure, including those commonly called "hexametaphosphates," "tetraphosphates," "septaphosphates," "decaphosphates," etc. The pyrophosphates are crystalline and are not as effective as the glassy phosphates. The tripolyphosphates can be obtained either as crystals or as glass and either is effective. There are two water-soluble crystalline molecularly dehydrated phosphates in this range, however, which are not effective in my process, namely, sodium trimetaphosphate $[(NaPO_3)_3]$ and sodium tetrametaphosphate $[Na_4P_4O_{12}]$, because they do not exhibit the phenomenon of sequestration when freshly dissolved in water containing bivalent or trivalent metal ions, but their solutions do change in time under certain conditions to produce a sequestering reaction, at which time these phosphates will serve effectively in my process. Also there are crystalline sodium metaphosphates which are practically insoluble in water, such as Maddrell salt $[(NaPO_3)x]$ and Kurrol salt $[NaPO_3)x]$, which, not being soluble, are not effective in my process but which, when solubilized (as can be done), become effective. Other water-soluble molecularly dehydrated phosphates than the sodium salts, such as lithium, potassium or ammonium salts, or solubilized calcium or strontium salts, are also effective in my process. In particular, the water-insoluble potassium Kurrol salt $[(KPO_3)x]$ when solubilized, as by the addition of sodium chloride (NaCl), is quite effective.

The accompanying drawing is a graph illustrating the changes in viscosity which can be obtained by adding sodium phosphate glass of $1.1Na_2O:P_2O_5$ ratio to a 0.2% sodium alginate dispersion and to a dispersion containing 0.2% sodium alginate plus 0.02% of calcium.

Referring now more particularly to the accompanying drawing, the ordinate represents the viscosities of the dispersions, as expressed in arbitrary units °M as measured at 30° C. on a MacMichael viscosimeter using a No. 30 wire on a disk plunger, and the abscissa represents the amount of sodium phosphate glass, expressed in per cent by weight of the water in the dispersion. Curve 1 represents the viscosity of a 0.2% sodium alginate dispersion as affected by the addition of sodium phosphate glass. Curve 2 represents the viscosity of a dispersion of a 0.2% sodium alginate solution containing 0.02% calcium as affected by the addition of sodium phosphate glass. From curve 1 it is seen that the viscosity of the sodium alginate solution is decreased only slightly by the addition of sodium phosphate glass. The effect of adding 0.02% of soluble calcium in compound form to the sodium alginate solution is to materially increase the viscosity. However, when this solution of increased viscosity is treated with sodium phosphate glass the viscosity is reduced, as indicated by curve 2, to a value as low as the 0.2% sodium alginate dispersion treated only with the phosphate glass. The curves illustrate one concentration of sodium alginate but it is to be understood that the addition of sodium phosphate glass to dispersions containing different amounts of sodium alginate, or of sodium alginate and calcium, affects the viscosity in a similar manner. For a given sodium alginate concentration there is a proportionate calcium concentration, usually around 1:15 calcium to sodium alginate ratio by weight at which the viscosity is a maximum. In sodium alginate dispersions of 0.1% or lower this 1:15 ratio corresponds approximately to the precipitation of calcium alginate. In more concentrated sodium alginate dispersions, say 0.2% or higher, this 1:15 ratio corresponds to the approximate maximum calcium concentration for the formation of highly viscous homogeneous sodium-calcium alginate gels. At higher calcium concentrations with respect to sodium alginate the insoluble calcium alginate precipitates. Thus the viscosity of commercial sodium alginate dispersions containing various amounts of calcium can be controlled over a wide range of concentrations and combinations by treatment with suitable amounts of sodium phosphate glass.

While the previously mentioned example and curve might seem to indicate that the addition of phosphate glass to an aqueous dispersion containing calcium and alginate always results in a decrease in viscosity such is not the case, since whether or not a decrease or increase in viscosity will be obtained depends upon the relative amounts of metal, alginate, and phosphate glass present. Accordingly it is necessary, in order properly to control the viscosity of the solution being treated to control the concentrations of the metal, alginate and phosphate glass in the solution.

The results to be achieved and the need for controlling the above mentioned factors is well exemplified by the production of chocolate milk drinks for which the process of my invention is eminently satisfactory. As was stated above sodium alginate is now used quite widely as a stabilizer for chocolate flavored milk drinks in order to keep the cocoa particles in suspension in the milk. The sodium alginate may be added dry or predissolved or made into a dispersion in water or milk and the dispersion added to the milk along with the other ingredients, or the sodium alginate may be incorporated in the chocolate flavoring syrup or other ingredients which are added to the milk. While the use of sodium alginate as a stabilizer for chocolate milk has come into quite wide use it is open to serious objections, since, in order to get viscosities high enough to suspend the chocolate powder, excessive quantities of alginate are required. This is not only costly, but also a slimy body or unpleasant taste is imparted to the chocolate milk, rendering it unpalatable.

I have found that in the case of chocolate milk drinks these difficulties can be overcome by employing a molecularly dehydrated phosphate in conjunction with the sodium alginate. For example, in preparing chocolate milk drinks I may add sodium alginate and molecularly dehydrated phosphate to the cocoa syrup and then add this to the milk. The preferred molecularly dehydrated phosphate is the sodium phosphate glass commonly known as Graham's salt, which has a mol ratio of $Na_2O$ to $P_2O_5$ of 1:1 or its commercial form known under the trade name "Calgon" which has a mol ratio of $Na_2O$ to $P_2O_5$ of 1.1:1. Other phosphate glasses having different ratios of $Na_2O$ to $P_2O_5$ may be employed, or the crystalline molecularly dehydrated phosphates, such as the alkali-metal pyrophosphates or tripolyphosphates may be used. The more nearly neutral molecularly dehydrated phosphates are preferred to avoid alkalinity in the product. For convenience in describing the invention further I shall refer to sodium metaphosphate, meaning by this expression the sodium phosphate glass commonly known in the trade as "Calgon" which is the commercial form of Graham's salt, it being understood that glasses having other ratios of alkali-metal oxide to $P_2O_5$ or the other molecularly dehydrated phosphates may be employed.

Where, according to my invention, both sodium alginate and sodium metaphosphate are added to the milk the sodium metaphosphate when added in proper amount controls the viscosity of the alginate, whereby increased viscosity may be obtained using relatively smaller amounts of alginates. Thus the amount of expensive sodium alginate required for stabilization is minimized, the viscosity is easily and accurately controlled and a pleasingly palatable milk product free of sedimentation and stratification is produced. Table I shows the effect on viscosity of adding phosphate glass to a chocolate flavored milk drink containing alginate.

TABLE I

| Alginate, percent | Sodium phosphate glass (1.1:1), percent | Relative viscosity | Remarks |
|---|---|---|---|
| 0.0 | 0.0 | 100 | Sediment. |
| 0.0 | 0.2 | 101 | Do. |
| 0.1 | 0.0 | 105 | Two layers. |
| 0.2 | 0.0 | 109 | Do. |
| 0.1 | 0.2 | 124 | Perfect suspension. |
| 0.2 | 0.2 | 183 | Do. |

In producing chocolate milk I prefer to use about 0.05% to 0.25% of sodium alginate and approximately the same amount of sodium metaphosphate, based on the weight of the milk.

It is to be understood that the use of alginates in stabilizing chocolate milk drinks is only one application of this invention to the stabilization of milk products. The invention contemplates the control of viscosity of milk products in general. My invention may be used in stabilizing suspensions of concentrated milk or suspensions made from concentrated milk or from powdered milk. It may be used in treating any preparation containing a substantial amount of soluble milk solids either alone or with other materials. It may be used, for example, in making ice cream or other frozen milk or cream products.

As I have previously stated, materials other than the alginates have been used as stabilizers in milk products, for example, pectin and gelatin. I have found, however, that neither of these materials is suitable for use in treating aqueous dispersions according to my invention. I have found that only the alginates have the property of combining with the metal compounds and molecularly dehydrated phosphates to produce a variable and controlled viscosity. Comparative viscosity tests using pectin, gelatin and alginate on ice cream mixes produced the results shown in the following table:

TABLE II

| Amt. percent | Stabilizer | 24-hour viscosity in centipoises (Brookfield) | | | |
|---|---|---|---|---|---|
| | | 0 Calgon [1] | 0.10% Calgon [1] | 0.25% Calgon [1] | 0.50% Calgon [1] |
| 0.15 | Sodium alginate | 924 | 804 | 523 | 138 |
| 0.15 | ----do---- | 952 | 786 | 553 | 103 |
| 0.38 | Gelatine (225 Bloom.) | 55 | 84 | 115 | 137 |
| 0.45 | ----do---- | 134 | 44 | 74 | 900 |
| 0.20 | Pectin (150 grade) | 142 | 70 | 95 | 105 |
| 0.25 | ----do---- | 178 | 74 | 96 | 118 |

[1] Sodium phosphate glass (1.1:1).

Tests of comparative stabilizing effect and viscosity were made with half-pint chocolate milk combinations using sodium alginate, pectin and gelatin with the following results:

TABLE III

A.—*Sodium alginate*

| Percent alginate | Percent sodium phosphate glass (1.1:1) | Appearance in 8-ounce bottle after 16 hrs. at 45° F. | Relative viscosity (55° F.) |
|---|---|---|---|
| 0.0 | 0.0 | ¾" chocolate sediment | 100 |
| 0.1 | 0.0 | ⅝" chocolate sediment | 102 |
| 0.1 | 0.1 | Slight chocolate sediment | 112 |
| 0.1 | 0.2 | ----do---- | 114 |
| 0.1 | 0.3 | Not completely uniform | 117 |
| 0.2 | 0.0 | ¾" chocolate sediment | 104 |
| 0.2 | 0.1 | Complete dispersion | 128 |
| 0.2 | 0.2 | ----do---- | 137 |
| 0.2 | 0.3 | ----do---- | 154 |
| 0.3 | 0.0 | ⅞" chocolate sediment | 110 |
| 0.3 | 0.1 | Mottled—Semi-gel | 346 |
| 0.3 | 0.2 | Complete dispersion—Semi-gel | 595 |
| 0.3 | 0.3 | ----do---- | 403 |

B.—*Pectin (150 grade)*

| Percent alginate | Percent sodium phosphate glass (1.1:1) | Appearance in 8-ounce bottle after 16 hrs. at 45° F. | Relative viscosity (55° F.) |
|---|---|---|---|
| 0.0 | 0.0 | ⅜" chocolate sediment | 100 |
| 0.1 | 0.0 | ----do---- | 104 |
| 0.1 | 0.1 | ----do---- | 105 |
| 0.1 | 0.2 | ----do---- | 106 |
| 0.1 | 0.3 | ----do---- | 109 |
| 0.2 | 0.0 | ----do---- | 107 |
| 0.2 | 0.1 | ----do---- | 107 |
| 0.2 | 0.2 | ----do---- | 110 |
| 0.2 | 0.3 | ----do---- | 113 |
| 0.3 | 0.0 | ----do---- | 111 |
| 0.3 | 0.1 | ----do---- | 112 |
| 0.3 | 0.3 | ----do---- | 117 |
| 0.5 | 0.0 | ¾" chocolate sediment | 119 |
| 0.5 | 0.1 | ⅝" chocolate sediment | 121 |
| 0.5 | 0.2 | ---- do ---- | 125 |
| 0.5 | 0.3 | ⅜" chocolate sediment | 127 |

C.—Gelatin (225 bloom)

| Percent gelatin | Percent sodium phosphate glass (1.1:1) | Appearance in 8-ounce bottle after 16 hrs. at 45° F. | Relative viscosity (55° F.) |
|---|---|---|---|
| 0.0 | 0.0 | ⅜" chocolate sediment | 100 |
| 0.1 | 0.0 | do | 102 |
| 0.1 | 0.1 | do | 104 |
| 0.1 | 0.2 | do | 107 |
| 0.1 | 0.3 | do | 109 |
| 0.2 | 0.0 | ¼" chocolate sediment | 105 |
| 0.2 | 0.1 | do | 108 |
| 0.2 | 0.2 | do | 111 |
| 0.2 | 0.3 | do | 113 |
| 0.3 | 0.0 | ⅛" chocolate sediment | 115 |
| 0.3 | 0.1 | do | 118 |
| 0.3 | 0.2 | do | 125 |
| 0.3 | 0.3 | do | 125 |
| 0.5 | 0.0 | Complete dispersion—Gel | 150 |
| 0.5 | 0.1 | do | 175 |
| 0.5 | 0.2 | do | 179 |
| 0.5 | 0.3 | do | 175 |

D.—No stabilizer

| Percent stabilizer | Percent sodium phosphate glass (1.1:1) | Appearance in 8-ounce bottle after 16 hrs. at 45° F. | Relative viscosity (55° F.) |
|---|---|---|---|
| 0.0 | 0.0 | ⅜" chocolate sediment | 100 |
| 0.0 | 0.1 | do | 102 |
| 0.0 | 0.2 | do | 104 |
| 0.0 | 0.3 | do | 106 |

It is apparent from a careful consideration of the above tables that only the alginate stabilized ice cream mixes and chocolate milk compositions showed the remarkable viscosity effect which is characteristic of my invention. In the case of the gelatin and pectin stabilized ice cream mixes the viscosities upon addition of the sodium phosphate glass were irregular and unpredictable whereas with the alginate stabilizer upon the addition of the sodium phosphate glass the viscosity regularly decreased as the concentration of sodium phosphate glass increased. In the case of chocolate milk drinks the only completely dispersed, nongelatinous mixture resulted from the use of sodium phosphate glass and alginate.

The method of treating aqueous dispersions to control their viscosity has various applications other than that of controlling the viscosity of milk products. I have found that the process of my invention may be applied to the preparation of abrasive polishing compostiions. Such compositions usually contain powdered pumice or other inert insoluble abrasive substance in a suspending medium. The abrasive polishing compositions may be sold in the form of creams, pastes, or jellies, or as a powder to be formed into a suspension with water before use. One difficulty with such pastes or suspensions now on the market is that the abrasive has a tendency to settle out of the suspension to form a layer at the bottom of the container in which it is held. According to my invention I overcome this tendency by adding to the suspension or to the powder from which the suspension is to be made, alginate, a compound yielding ions of a metal which modifies the viscosity of the alginate dispersion and sodium metaphosphate or other molecularly dehydrated alkali-metal phosphate in an amount to give the desired viscosity. It is possible, and may at times be desirable to add the metal ion required as a part of the alginate, for example, as iron alginate.

Another way of overcoming the tendency of abrasives to settle when a powder is made into a paste or a dispersion with water, is to add to the powder or to the suspension, calcium alginate or other water-insoluble alginate and sodium metaphosphate. The sodium metaphosphate reacts with the water-insoluble alginate, thereby increasing the viscosity of the suspension.

The invention may also be employed in the production of textile printing pastes. These pastes contain a color body, water as a vehicle for the color body, and an alginate such as sodium alginate. The viscosity and suspending power of the vehicle may be controlled, according to my invention, by including regulated amounts of sodium metaphosphate and, when desired, a compound yielding metal ion which modifies the viscosity of the vehicle in such printing pastes. The inclusion of sodium metaphosphate in the printing paste prevents excessive viscosity due to metals incidentally present, while the addition of the compound yielding metal ion is used to control the viscosity at its optimum value. Thus the suspending power of the paste or suspension on the color body may be accurately controlled. In addition to the aforementioned advantages, the sodium metaphosphate produces a more homogeneous paste.

For many uses it is desirable to obtain an alginate solution of maximum viscosity by the use of a minimum amount of the expensive sodium alginate. This may be done by adding a calcium compound or other metal compound to the sodium alginate solution, but it is difficult to produce maximum viscosity by this method because after maximum viscosity has been reached, any excess metal ion causes precipitation of the water-insoluble metal alginate, and the viscosity of the solution lowers very rapidly and the mixture becomes lumpy and contains precipitated alginate particles. I have found that I can produce an alginate dispersion having maximum viscosity by adding water-soluble metal compound in such an amount as to go somewhat beyond the point of maximum viscosity, thereby causing precipitation of metal alginate, and thereafter adding sodium metaphosphate in regulated amounts in order to bring back the dispersion to its maximum viscosity. The use of sodium metaphosphate for regulating the viscosity of an alginate dispersion containing metal ion, is not limited to causing precipitation of insoluble metal alginate and thereafter adding sodium metaphosphate to increase the viscosity of the solution. For instance, if it is desired to produce a certain viscosity from a sodium alginate dispersion by the addition of metal compound, sodium metaphosphate may be added to the dispersion if, through inadvertence, the amount of metal compound added was in excess of that required to produce the desired viscosity but less than that required to precipitate insoluble metal alginate. In this case the heavy-metal compound increased the viscosity to an undesirable extent. The addition of the proper amount of sodium metaphosphate will lower the viscosity to the point desired. Thus the addition of sodium metaphosphate will either increase or decrease the viscosity of an alginate dispersion containing metal ion, depending on the ratio of sodium metaphosphate to metal ion.

Another way of producing an alginate solution of maximum viscosity or of any desired viscosity is to add calcium alginate or other water-insoluble metal alginate to water, and then add regulated amounts of sodium metaphosphate. As the amount of sodium metaphosphate added is increased the metal alginate goes into colloidal dispersion or solution and the viscosity of the dispersion increases up to a maximum and then decreases. The amount of metaphosphate added is selected so as to give the optimum viscosity within this range. Instead of first forming a dispersion of water-insoluble metal alginate and thereafter adding sodium metaphosphate to the dispersion, I may make a mixure of metal alginate and sodium metaphosphate in the proportions required for producing the desired viscosity of the dispersion, or I may add metal compound and sodium metaphosphate in solution to a sodium alginate dispersion.

If it is desired to produce an alginate solution which has an initial low viscosity and to increase the viscosity of the solution slowly, I may start with a sodium alginate solution and add to it a slowly-soluble compound yielding ions of calcium or other metal which modify the viscosity of alginate dispersions. As the slowly-soluble compound dissolves, introducing metal ion progressively into the solution, the viscosity of the solution increases. Any slowly-soluble metal compound which modify the viscosity of alginate dispersions may be employed, but a preferred material for this purpose is a phosphate glass of a metal which modify the viscosity of alginate dispersions or of a metal which modify the viscosity of alginate dispersions and an alkali metal, for example a sodium-calcium phosphate glass. As the phosphate glass slowly dissolves and reverts, at a rate depending upon the particular conditions, to orthophosphate, metal ion is made available for reaction with the sodium alginate to increase the viscosity of the dispersion.

In describing the invention I have usually referred to sodium metaphosphate or sodium phosphate glass, but it is to be understood that in all cases I may use other molecularly dehydrated phosphates, such as the pyrophosphates or tripolyphosphates. The molecularly dehydrated phosphates will usually be water-soluble alkalimetal or ammonium phosphates, although I may employ where desired the less readily soluble salts containing both alkali metal and metal which modify the viscosity of alginate dispersions or the mixed phosphate glasses of one or more alkali metals and one or more metal which modify the viscosity of alginate dispersions.

In the claims, the term "molecularly dehydrated alkali-metal phosphate" is intended to include molecularly dehydrated ammonium phosphate or molecularly dehydrated phosphate compositions, whether glassy or crystalline, containing alkali metal or ammonia and one or more metals which modify the viscosity of alginate dispersions.

The invention is not limited to the particular embodiments described but may be otherwise embodied or practiced within the scope of the following claims:

I claim:

1. The process of treating an aqueous dispersion having as one constituent a water-soluble metal compound having the property of modifying the viscosity of an alginate dispersion, which comprises adding to the dispersion a molecularly dehydrated phosphate in an amount so related to the total metal in solution that some but not all of the metal will be sequestered, leaving some available metal ion in solution, and adding a water-soluble alginate to the dispersion whereby the free metal ion reacts with the alginate, the amount of free metal ion being so regulated that a portion only of the alginate will be reacted.

2. The process of treating an aqueous dispersion having as one constituent a water-soluble metal compound of the group consisting of calcium, barium, strontium, silver, copper, zinc, aluminum, titanium, tin, lead, mercury, vanadium, antimony, chromium, manganese, iron, cobalt, nickel and lanthanum, which comprises adding to the dispersion a molecularly dehydrated phosphate in an amount so related to the total metal in solution that some but not all of the metal will be sequestered, leaving some available metal ion in solution, and adding sodium alginate to the dispersion whereby the free metal ion reacts with the alginate, the amount of free metal ion being so regulated that a portion only of the alginate will be reacted with the metal compound.

3. The process of treating an aqueous dispersion having as one constituent a water-soluble calcium compound which comprises adding to the dispersion a molecularly dehydrated phosphate in an amount so related to the total calcium in solution that some but not all of the calcium will be sequestered, leaving some available calcium ion in the solution and adding sodium alginate to the dispersion whereby the free calcium ion reacts with the alginate, the amount of free calcium ion being so regulated that a portion only of the alginate will be reacted.

4. The process of treating an aqueous dispersion of milk solids which comprises adding to the dispersion a molecularly dehydrated phosphate in an amount so related to the total calcium content of the milk solids that some but not all of the calcium will be sequestered, leaving some available calcium ion in solution, and adding sodium alginate to the dispersion whereby the free calcium ion reacts with the alginate, the amount of free calcium ion being so regulated that a portion only of the alginate will be reacted.

5. The process of treating an aqueous dispersion having as constituents a water-soluble metal compound having the property of modifying the viscosity of an alginate dispersion and a finely divided solid material in aqueous suspension to stabilize the suspension which comprises adding to the dispersion a molecularly dehydrated phosphate in an amount so related to the metal in solution that some but not all of the metal will be sequestered, leaving some available metal ion in the solution, and adding a water-soluble alginate to the dispersion whereby the free metal ion reacts with the alignate, the amount of free metal ion being so regulated that a portion only of the alginate will be reacted.

6. The process of treating an aqueous dispersion having as constituents a water-soluble metal compound having the property of modifying the viscosity of an alginate dispersion and a color body in aqueous suspension to form a textile printing paste, which comprises adding to the dispersion a molecularly dehydrated phosphate in an amount so related to the metal in solution that some but not all of the metal will be sequestered, leaving some available metal ion in the solution, and adding a water-soluble alginate to the dispersion whereby the free metal ion reacts with the alginate, the amount of free metal ion being so regulated that a portion only of the alginate will be reacted.

7. A process of treating an aqueous dispersion having as constituents a water-soluble metal compound, an alginate dispersion and an abrasive material in aqueous suspension to form an abrasive paste, which comprises adding to the dispersion a molecularly dehydrated phosphate in an amount so related to the metal in solution that some but not all of the metal will be sequestered, leaving some available metal ion in the solution, and adding a water-soluble alginate to the dispersion whereby the free metal ion reacts with the alginate, the amount of free metal ion being so regulated that a portion only of the alginate will be reacted.

8. A process of treating an aqueous dispersion of milk solids and cocoa particles to stabilize the dispersion by preventing the cocoa particles from settling which comprises adding to the dispersion a molecularly dehydrated phosphate in an amount so related to the total calcium content of the milk solids that some but not all of the calcium will be sequestered, leaving some available calcium ion in solution, and adding sodium alginate to the dispersion whereby the free calcium ion reacts with the alginate, the amount of free calcium ion being so regulated that a portion only of the alginate will be reacted.

9. The process of treating an aqueous dispersion having as one constituent a water-soluble calcium compound which comprises adding to the dispersion a sodium phosphate glass in an amount so related to the total calcium in solution that some but not all of the calcium will be sequestered leaving some available calcium ion in the solution and adding sodium alginate to the dispersion whereby the free calcium reacts with the alginate, the amount of free calcium being so regulated that a portion only of the calcium will be reacted.

10. The process of treating an aqueous dispersion of milk solids which comprises adding to the dispersion a sodium phosphate glass in an amount so related to the total calcium content of the milk solids that some but not all of the calcium will be sequestered, leaving some available calcium ion in solution, and adding sodium alginate to the dispersion whereby the free calcium ion reacts with the alginate, the amount of free calcium ion being so regulated that a portion only of the alginate will be reacted.

11. The process of controlling the viscosity of dispersions made from water-soluble alginates which comprises adding to said dispersions a molecularly dehydrated alkali metal phosphate and a water-soluble metal compound having the property of modifying the viscosity of an alginate dispersion, the relative amounts of molecularly dehydrated alkali metal phosphate and water-soluble metal compound being so regulated that a portion only of the alginate will be reacted with the metal compound.

12. The process of stabilizing a suspension of solid particles in a milk product which comprises incorporating therein a water-soluble alginate and a molecularly dehydrated alkali metal phosphate in such proportions that the amount of free calcium ion is so regulated that a portion only of the alginate will be reacted.

13. The process of adjusting the viscosity of a water-soluble alginate dispersion which comprises adding thereto a water-soluble compound of a nature having the property of modifying the viscosity of the alginate dispersion in amount in excess of that required to produce the required viscosity and thereafter adding to the dispersion molecularly dehydrated alkali metal phosphate in an amount sufficient to obtain the desired viscosity.

14. The process of inhibiting the precipitation of metal alginates from a solution containing metal ions in an amount sufficient to precipitate metal alginates upon addition of a water-soluble alginate to the solution which comprises adding a molecularly dehydrated alkali metal phosphate to said solution.

15. A stabilized aqueous dispersion containing milk solids comprising a water soluble alginate and a sufficient amount of molecularly dehydrated phosphate to regulate the amount of alginate which is combined with the calcium of the milk solids.

16. A stabilized aqueous dispersion of cocoa particles and milk solids comprising a water-soluble alginate and an amount of molecularly dehydrated alkali metal phosphate sufficient to permit a portion but not all of the alginate to react with the calcium of the milk solids.

17. A textile printing paste comprising a suspension of a color body in an aqueous vehicle a water-soluble alginate, a water-soluble metal compound having the property of modifying the viscosity of an alginate dispersion and a molecularly dehydrated phosphate in an amount such that a part but not all of the alginate will be reacted with the metal ion of the metal compound.

18. An abrasive polishing composition comprising an abrasive suspended in an aqueous medium containing a water-soluble alginate, a water-soluble metal compound having the property of modifying the viscosity of an alginate dispersion and a molecularly dehydrated phosphate in an amount such that a portion but not all of the alginate will be reacted with the metal ion of the metal compound.

19. The process of treating an aqueous dispersion having as one constituent a water-soluble metal compound having the property of modifying the viscosity of an alginate dispersion which comprises adding to the dispersion, molecularly dehydrated phosphate having an alkali metal oxide to $P_2O_5$ ratio of between about 1:1 and 2:1 in amount so related to the metal in solution that some but not all of the metal will be sequestered leaving some available metal ion in solution, and adding a water-soluble alginate to the dispersion whereby the free metal ion reacts with the alginate, the amount of free metal ion being so regulated that a portion only of the alginate will be reacted.

20. The process of treating an aqueous dispersion of milk solids which comprises adding to the dispersion a molecularly dehydrated phosphate having an alkali metal oxide to $P_2O_5$ ratio of between about 1:1 and 2:1 in amount so related to the total calcium content of the milk solids that some but not all of the calcium will be sequestered leaving some available calcium ion in solution, and adding sodium alginate to the dispersion whereby the free calcium ion reacts with the alignate, the amount of free calcium ion being so regulated that a portion only of the alginate will be reacted.

21. The process of treating an aqueous dispersion having as one constituent a water-soluble calcium compound which comprises adding to the dispersion a molecularly dehydrated phosphate having an alkali metal oxide to $P_2O_5$ ratio of between about 1:1 and 2:1 in amount so related to the total calcium in solution that some but not all of the calcium will be sequestered leaving some available calcium ion in the solution, and adding sodium alginate in the solution whereby the free calcium ion reacts with the alginate, the amount of free calcium ion being so regulated that a portion only of the alginate will be reacted.

22. The process of treating an aqueous dispersion having as constituents a water-soluble metal compound having the property of modifying the viscosity of alginate dispersion and a finely divided solid material in aqueous suspension to stabilize the suspension which comprises adding to the dispersion a molecularly dehydrated phosphate having an alkali metal oxide to $P_2O_5$ ratio of between about 1:1 and 2:1 in an amount so related to the material in solution that some but not all of the metal will be sequestered, leaving some available metal ion in the solution, and adding a water-soluble alginate to the dispersion whereby the free metal ion reacts with the alginate, the amount of free metal alginate being so regulated that a portion only of the alginate will be reacted.

23. The process of treating an aqueous dispersion having as one constituent a water-soluble metal compound having the property of modifying the viscosity of an alginate dispersion which comprises adding to the dispersion a molecularly dehydrated phosphate having an alkali metal oxide to $P_2O_5$ ratio of about 1.1:1 in an amount so related to the metal in solution that some but not all of the metal will be sequestered leaving some available metal ion in solution, and adding a water-soluble alginate to the dispersion whereby the free metal ion reacts with the alginate, the amount of free metal ion being so regulated that a portion only of the alginate will be reacted.

24. The process of treating an aqueous dispersion of milk solids which comprises adding to the dispersion a molecularly dehydrated phosphate having an alkali metal oxide to $P_2O_5$ ratio of about 1.1:1 in amount so related to the total calcium content of the milk solids that some but not all of the calcium will be sequestered leaving some available calcium ion in solution and adding sodium alginate to the dispersion whereby the free calcium ion reacts with the alginate, the amount of free calcium ion being so regulated that a portion only of the alginate will be reacted.

25. The process of treating an aqueous dispersion having as one constituent a water-soluble calcium compound which comprises adding to the dispersion of molecularly dehydrated phosphate having an alkali metal oxide to $P_2O_5$ ratio of 1.1:1 in an amount so related to the total calcium in solution that some but not all of the calcium will be sequestered leaving some available calcium ion in the solution and adding sodium alginate in the solution whereby the free calcium ion reacts with the alginate, the amount of free calcium ion being so regulated that a portion only of the alginate will be reacted.

26. The process of treating an aqueous dispersion having as constituents a water-soluble metal compound having the property of modifying the viscosity of alginate dispersion and a finely divided solid material in aqueous suspension to stabilize the suspension which comprises adding to the dispersion a molecularly dehydrated phosphate having an alkali metal oxide to $P_2O_5$ ratio of about 1.1:1 in an amount so related to the material in solution that some but not all of the metal will be sequestered, leaving some available metal ion in the solution, and adding a water-soluble alginate to the dispersion whereby the free metal ion reacts with the alginate, the amount of free metal alignate being so regulated that a portion only of the alginate will be reacted.

27. A process of treating an aqueous dispersion of milk solids and cocoa particles to stabilize the dispersion by preventing the cocoa particles from settling which comprises adding to the dispersion a molecularly dehydrated phosphate having an alkali metal oxide to $P_2O_5$ ratio of 1.1:1 in an amount so related to the total calcium content of the milk solids that some but not all of the calcium ion will be sequestered leaving some available calcium ion in solution, and adding sodium alginate to the dispersion whereby the free calcium ion reacts with the alginate, the amount of free calcium ion being so regulated that a portion only of the alginate will be reacted.

28. A stabilized aqueous dispersion of cocoa particles and milk solids comprising a water-soluble alginate and an amount of a molecularly dehydrated alkali metal phosphate having an alkali metal oxide to $P_2O_5$ ratio of 1.1:1 sufficient to permit a portion but not all of the alginate to react with the calcium of the milk solids.

29. A stabilized aqueous dispersion containing milk solids comprising a water-soluble alginate and a sufficient amount of a molecularly dehydrated phosphate having an alkali metal oxide to $P_2O_5$ ratio of 1.1:1 to regulate the amount of alginate which is combined with the calcium of the milk solids.

30. A stabilized aqueous dispersion comprising a water-soluble metal compound having the property of modifying the property of an alginate dispersion, a suspension of a finely divided solid material and an amount of a molecularly dehydrated alkali metal phosphate having an alkali metal oxide to $P_2O_5$ ratio of about 1.1:1 sufficient to permit a portion but not all of the alginate to react with the metal compound.

CHARLES T. ROLAND.

References Cited in the file of this patent

UNITED STATES PATENTS

| Number | Name | Date |
|---|---|---|
| 1,897,892 | Draisbach | Feb. 14, 1933 |
| 2,064,387 | Schwartz | Dec. 15, 1936 |
| 2,081,273 | Hoermann et al. | May 25, 1937 |
| 2,097,230 | Lucas | Oct. 26, 1937 |
| 2,097,231 | Lucas | Oct. 26, 1937 |
| 2,103,411 | Frieden et al. | Dec. 28, 1937 |
| 2,135,054 | Schwartz | Nov. 1, 1938 |
| 2,207,299 | Mnookin | July 9, 1940 |
| 2,216,485 | Brandt | Oct. 1, 1940 |
| 2,253,389 | Mnookin | Aug. 19, 1941 |
| 2,267,911 | Grettie et al. | Dec. 30, 1941 |
| 2,405,861 | Tod | Aug. 13, 1946 |

FOREIGN PATENTS

| Number | Country | Date |
|---|---|---|
| 446,529 | Great Britain | Apr. 30, 1936 |

OTHER REFERENCES

Sommer: The Theory and Practice of Ice Cream Making, 3rd ed., pages 428–430. (Published by the author at Madison, Wis., 1938.)